United States Patent [19]
Aldrovandi

[11] Patent Number: 5,529,795
[45] Date of Patent: Jun. 25, 1996

[54] METHOD AND APPARATUS FOR PRODUCING LONGITUDINAL PASTA FILATA CHEESE PRODUCTS

[75] Inventor: Claudio Aldrovandi, Castelfranco Emilia, Italy

[73] Assignee: Dima S.R.L., Modena, Italy

[21] Appl. No.: 302,858

[22] PCT Filed: Mar. 8, 1993

[86] PCT No.: PCT/IT93/00019

§ 371 Date: Sep. 12, 1994

§ 102(e) Date: Sep. 12, 1994

[87] PCT Pub. No.: WO93/17549

PCT Pub. Date: Sep. 16, 1993

[30] Foreign Application Priority Data

Mar. 13, 1992 [IT] Italy .................. BO92A0088
Feb. 23, 1993 [IT] Italy .................. BO93A0063

[51] Int. Cl.⁶ .................. A01J 25/00; A23C 19/00
[52] U.S. Cl. .................. 426/231; 99/452; 99/493; 425/149; 426/512; 426/582

[58] Field of Search .................. 426/516, 517, 426/582, 231, 506, 36; 99/452, 459, 493; 425/149

[56] References Cited

U.S. PATENT DOCUMENTS 4,288,465  9/1981  Meyer .................. 426/582
4,902,523  2/1990  Fritchen et al. .................. 426/231

FOREIGN PATENT DOCUMENTS 0186795  7/1986  European Pat. Off. .
57-206334 12/1982  Japan .

Primary Examiner—George Yeung
Attorney, Agent, or Firm—Herbert Dubno; Yuri Kateshov

[57] ABSTRACT

The method includes extruding the pasta filata cheese in form of a cord (2) that is left hanging up to a belt (7) operated at a speed higher than the speed of the coming out of the cord (2) from an extruding device (1) so as to cause a stretching in the free strap of the cord comprised between the extruding device (1) and the transport belt (7). The stretched ribbon (2) is then transversally severed in single portions (18).

6 Claims, 4 Drawing Sheets

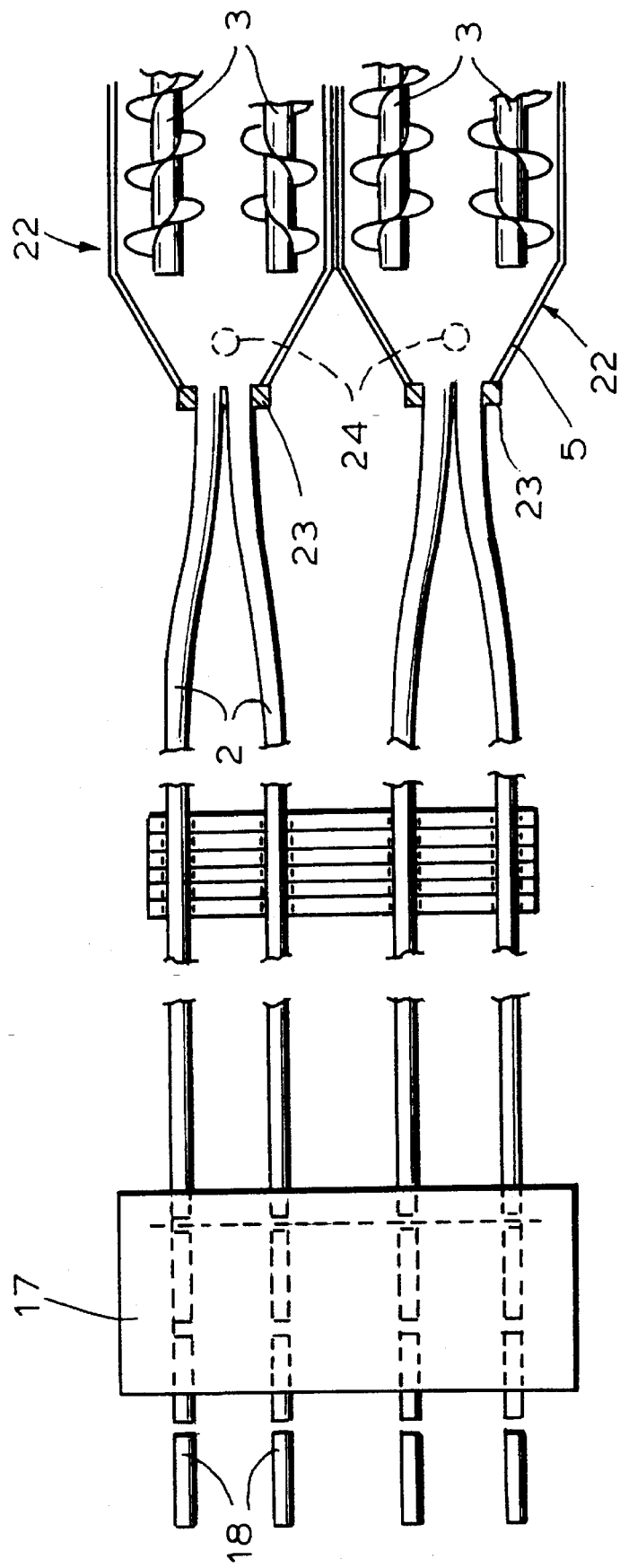

METHOD AND APPARATUS FOR PRODUCING LONGITUDINAL PASTA FILATA CHEESE PRODUCTS

CROSS REFERENCE TO RELATED APPLICATIONS

This is a national phase application of PCT/IT93/00019 filed Mar. 8, 1993 and based upon Italian national applications BO 92 A 000088 and BO 93 A 000063 of Mar. 13, 1992 and Feb. 23, 1993 respectively under the International Convention.

FIELD OF THE INVENTION

The present invention the production of pasta filata cheese, such as mozzarella and the like.

BACKGROUND OF THE INVENTION

It is known that various types of pasta filata cheese are presently produced in form of a cord or strand from which single portions are severed.

In order to obtain such cord, the cheese paste from out of the molding machine is fed into a hopper.

The cord delivered from the hopper is subjected to a manual tug that provides a stretching of the strand.

Obviously, a manual process brings various hygiene and productivity inconveniences.

In order to overcome such disadvantages many apparatuses are known for stretching of the cheese cord by means of rolls (see JP-57-206334).

The document U.S. Pat. No. 4,288,465 discloses a method and an apparatus suitable for shaping pasta filata cheese comprising the steps of extruding pasta filata cheese through extruding means in order to obtain a strand of cheese which is brought to a pair of adjacent, rotating drums around which the cheese strand is wrapped. The drums are operated at a speed higher than the extrusion speed to cause the strand to stretch.

The strand then passes through a cooling vat under tension and, after pulling and cooling, it is cut to length suitable for packaging.

The above apparatus provides no effective means suitable for controlling automatically the tension applied to the stretched strand, except that the speed of the drums could be controlled by the adjustable power supply of the motor of the same drums.

The mentioned apparatuses have not solved effectively the problems connected with shaping pasta filata cheese into form of cord.

OBJECTS OF THE INVENTION

The object of the present invention is to provide a method that allows to obtain automatically stretched cords of pasta filata cheese.

A further object of the invention is to provide an apparatus that allows to carry out the above mentioned method, in a simple and effective way with increased productivity.

SUMMARY OF THE INVENTION

The objects are obtained in a method for shaping pasta filata cheese into cords, which includes:

extruding pasta filata cheese through extruding means, for obtaining at least one cord of pasta filata cheese;

bringing the pasta filata cord to a transport means operated at a speed higher than the coming out speed of the cord from the extruding means thereby stretching the cord located between the extruding means and transport means, as well as a cord section on the transport means; and transversally cutting the stretched pasta filata cord in single portions.

An apparatus for shaping pasta filata cheese into form of cord includes:

extruding means for delivering pasta filata cheese in form of at least one cord;

transport means operated at a speed higher than the speed of the coming out of the cord from the extruding means, so as to cause a stretching in the free strap of the same cord located between the extruding means and transport means and in the cord section situated on the transport means; and cutting means for severely transversally the single portions of the stretched pasta filata cord.

The described method allows to obtain, in a fully automatic way, stretched cords of pasta filata cheese, with clear advantages in terms of the production, homogeneity and hygiene of the product are concerned.

Moreover, the aforementioned method can be carried out by means of a very simple apparatus and allows to adjust the paste stretching degree, by controlling the speed of the transport belt.

BRIEF DESCRIPTION OF DRAWINGS

The above and other characteristics, features and advantages of the invention will become more readily apparent from the following, references being made to the drawing, in which:

FIG. 4 is a plain enlarged view of the apparatus of FIG. 3, with some parts taken away in order to highlight others.

SPECIFIC DESCRIPTION

Figure 1:
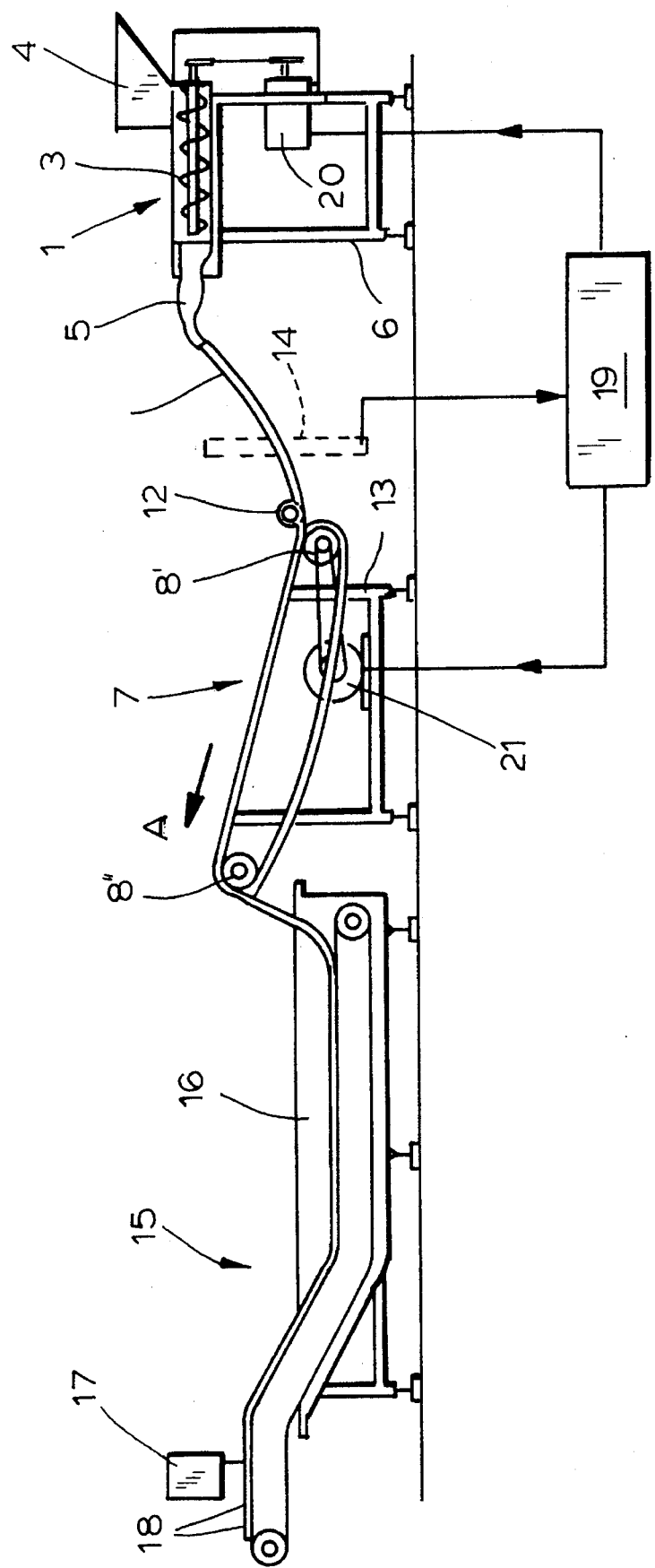
FIG. 1 is a schematic longitudinal sectional view of the apparatus for the shaping of pasta filata cheese into form of cord.

With reference to,the above mentioned figures, reference numeral 1 indicates means for extruding pasta filata cheese in form of a cord 2.

The extruding means 1 include a screw feeder 3 located below a hopper 4, which is filled with the cheese paste. The feeder delivers the cheese in a form of a cord 2 onto a conveyor 5.

The screw feeder 3 is supported horizontally at a certain height, by a fixed framework 6. Rotation of the screw feeder 3 causes the cheese paste contained in the hopper 4 to be extruded.

The cord 2 coming out of the conveyor 5 is fed to the inlet of the transporting belt 7, located downstream of the extruding means 1, in a way that the strand hangs between the extruding means and the belt 7.

The transporting belt 7 winds on rolls 8, placed at different height with an upstream roll 8' located lower than a downstream roll 8" with reference to the advancement direction A.

Figure 2:
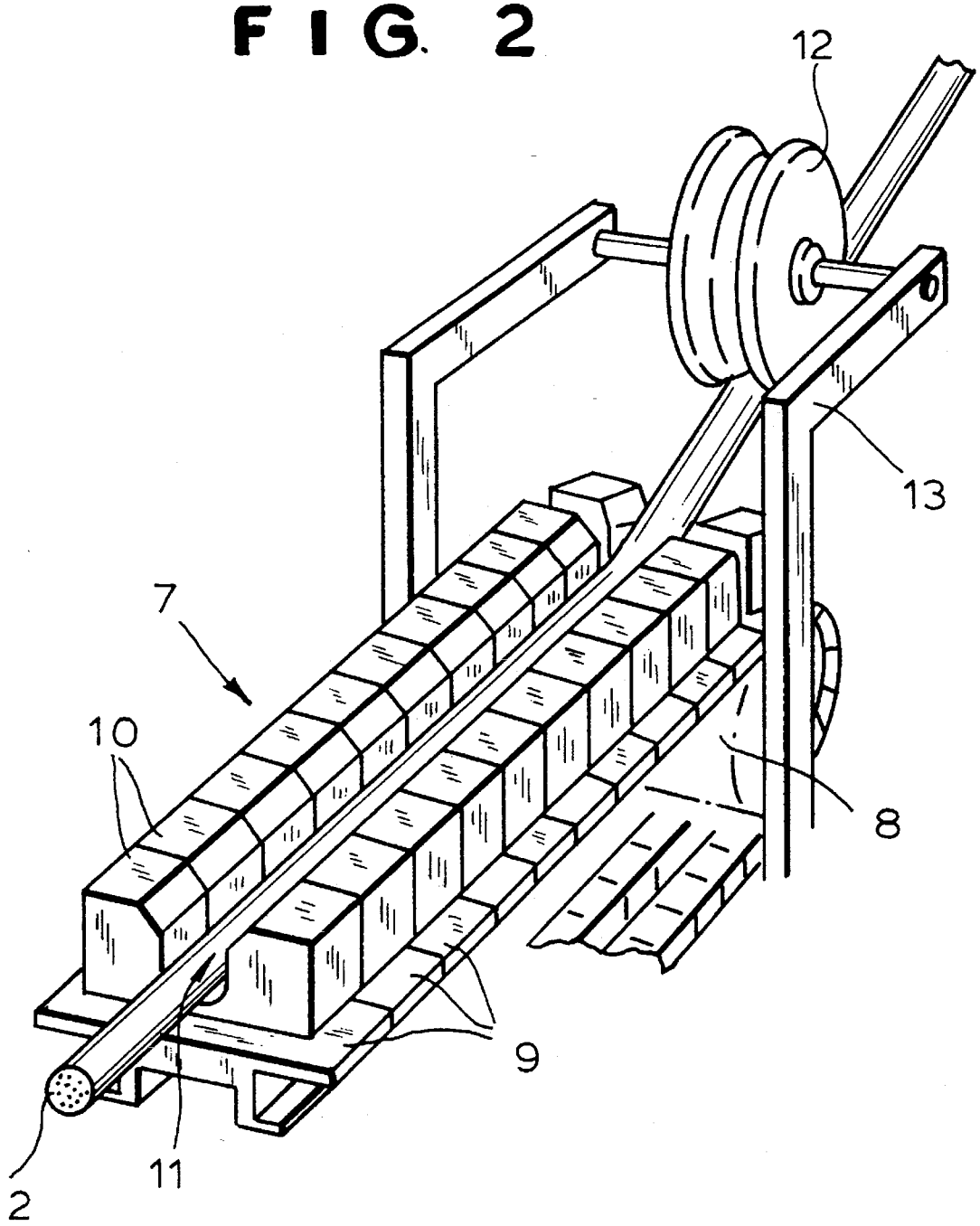
FIG. 2 is a perspective view of part of the apparatus.

As it can be seen in FIG. 2, the transporting belt 7 is formed by a continuous series of segments 9 linked to chain means not shown and provided with respective grooved blocks 10; the blocks 10 form a throat 11 in which the cord 2 lies while advancing.

The cord 2 runs in the groove of a midler guide roll 12 that is rotatably supported by the fixed framework 13 of the transport belt in a position adjacent to the inlet.

The operating speed of the transport belt 7 is higher than the one of the cord 2 coming out of the extruding means 1, so that the difference in speed causes the cord 2 to be stretched between the extruding means 1 and the transport belt 7.

The cord is gradually stretched also along the transport belt 7.

As a matter of fact the cord 2 takes the speed of the block 10 only when it reaches the final stretch of the upper run of the transport belt 7.

Because of gravity, the section of the cord between the extruding means 1 and the transport belt 7 describes a downwardly curved path thus forming a camber, the convexity of which can be detected by any suitable means, for example, an optic means, indicated schematically with the hatched line 14 in FIG. 1.

The width of such camber indirectly is a measure of the stretching of the cord 2, thus allowing to proper adjustment of the transport belt 7 operating speed, or, alternatively, the extruding means 1, or both.

At the outlet of the transport belt 7, the cord 2 falls onto a further transport belt 15 partially dipped in a basin 16 for cheese pre-hardening.

At the outlet of the basin 16, the cord 2 is brought by the transporting belt 15 in correspondence with cutting means 17, that are designed to sever transversally single portions 18 from the cord.

The single portion are then addressed to a subsequent phase of packing.

Obviously, it is possible to provide that the cord 2, going out of the basin 2, advances along a horizontal straight path.

Preferably, the detecting means 14 are connected to a control unit 19 designed to actuate the motors 20 and 21 that operate respectively the screw feeder 3 and the transport belt 7.

Figure 3:
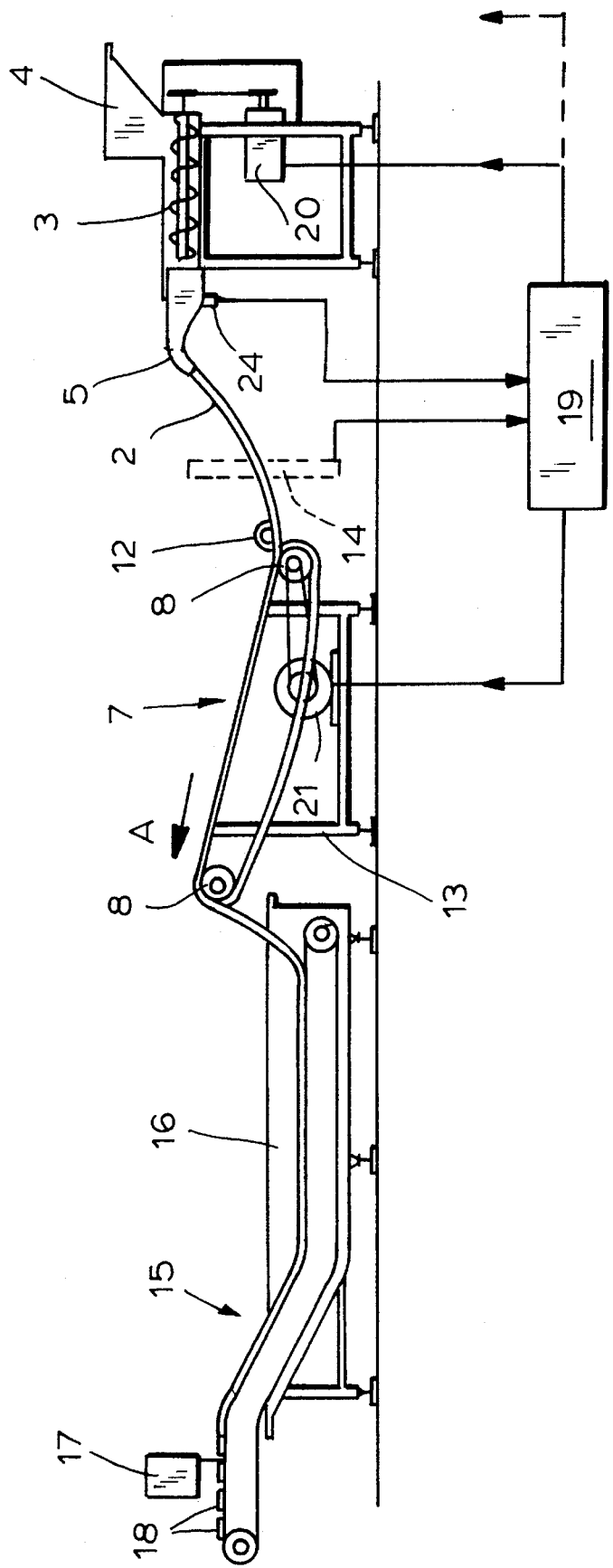
FIG. 3 is a longitudinal sectional view of another embodiment of the apparatus.

FIGS. 3 and 4 show another embodiment of the apparatus for shaping a cheese cord.

This embodiment of the apparatus is designed in particular to bring about an improvement in production without excessively increasing the advancement speed of the cheese cords.

An excessive high advancement speed could compromise the effectivness of stretching the cheese cords and the correct functioning of the cutting means.

According to the other embodiment, the apparatus provides at least one couple of extruding groups 22, placed side by side in a horizontal plane. Each of the extruders is equipped with a respective couple of parallel screw feeders 3 (see FIG. 4).

The number of the extruding groups 22 depends obviously on the productivity rate that is desired.

The conveyor 5 of the extruding groups has a head 23 equipped with a double outlet throat, for delivering two cheese cords 2.

It is possible to obtain the same quantity of pasta filata cheese from both outlet throats, while with a larger number of cords this would be surely not happen.

At the outlet of the extruding groups 22, the cheese cords 2 are taken over by the transport belt 7 and then carried as previously described, through the pre-hardening basin 16 and up to the cutting means 17, which are designed to sever transversally single portions 18 of cheese.

The cheese cords 2 advance at the same speed, whether the transport means comprise only one belt, equipped with a plurality of grooved blocks, or single side by side belts both provided with grooved blocks.

The extruding groups 22 are equipped with sensor means 24 designed to detect the extruding pressure value acting on the cheese paste.

In fact, such pressure can vary in accordance with the cheese paste density, hence causing different quantities of cheese to go out of the extruding groups.

The pressure values detected by the sensor means 24 are sent to the control unit 19 for actuating the engines 20, 21, so that to automatically adjust the operation speed of the screw feeders 3 in case of deviation of the prefixed pressure values.

This way it is possible to maintain constant the cheese paste extruding pressure and therefore to obtain the feeding of equal and constant paste quantities from different extruding groups 22.

Such regulation does not depend on the camber length, detected by the means 14, which instead gives an indirect measure of the entity of the cords 2 stretching, thus allowing in turn, to properly adjust the operation speed of the transport belt 7, or otherwise the speed of the extruding means 1, or both.

The described method allows to obtain, in a fully automatic way, stretched cords of pasta filata cheese, with clear advantages as far as the production, homogeneity and hygiene of the product are concerned.

Moreover, the aforementioned method can be carried out by means of a very simple apparatus and allows to adjust the paste stretching degree, by controlling the speed of the transport belt 7.

I claim:

1. A process for producing longitudinal pasta filata cheese products, comprising the steps of:

extruding pasta filata cheese at a first speed through at least one extrusion aperture, thereby forming at least one cheese cord;

displacing said cord on at least one conveyor operated at a second speed higher than said first speed and located downstream of said one extrusion aperture, thereby stretching a free stretch of the one cord curved downwardly between said conveyor and extruder under gravity and forming a camber;

measuring said camber while stretching the cord in said stretch;

controllably varying at least one of the first speed and the second speed upon measuring the camber to adjust said camber; and thereafter transversely severing a predetermined length of said one cheese cord downstream of said one conveyor, thereby forming a plurality of single cheese products.

2. The process defined in claim 1, further comprising the step of measuring a pressure of pasta filata cheese in the extruder, and controlling the first speed in response to said pressure.

3. The process defined in claim 1, further comprising the step of dipping said cord in a basin to pre-harden the cord before cutting the latter into individual cheese products.

4. An apparatus for producing longitudinal pasta filata cheese products, comprising:

extruding means for extruding at least one pasta filata cheese cord at a first speed;

transport means downstream of the extruding means receiving and guiding said cord along a path at a second speed which is lower than said first speed, so that a free strap of said cord is stretched between said extruding and transport means, said strap being curved downwardly under the gravity and forming a camber;

measuring means for measuring said camber;

control means for regulating the first speed, second speed, or first and second speeds to adjust said camber; and cutting means for transversely severing a predetermined length of said one cheese cord downstream of said transport means to form a plurality of single cheese products.

5. An apparatus for producing longitudinal pasta filata cheese products, comprising:

extruding means for extruding at least one pasta filata cheese cord at a first speed and at an extruding pressure;

transport means downstream of the extruding means receiving and guiding said cord along a path at a second speed which is lower than said first speed, so that a free strap of the cord is stretched between said extruding and transport means;

sensor means for measuring said extruding pressure;

control means for adjusting said extruding pressure upon measuring to a predetermined pressure in the extruding means; and cutting means for transversely severing said stretched free strap downstream of said transport means to form a plurality of individual cheese products.

6. The apparatus defined in claim 5 wherein said extruding means includes a plurality of screw feeders and a plurality of conveyors, each of said conveyors communicating with a respective pair of said screw feeders and provided with a respective head having a double outlet throat for delivering respective pair of cheese cords to said transport means.

* * * * *